United States Patent Office 3,400,002
Patented Sept. 3, 1968

3,400,002
PROVIDING LOW VISCOSITIES FOR AGED
SILICEOUS SLURRIES
Ralph W. Bauer, Wadsworth, Ohio, assignor to Pittsburgh Plate Glass Company, Pittsburgh, Pa., a corporation of Pennsylvania
No Drawing. Filed Apr. 8, 1964, Ser. No. 358,365
8 Claims. (Cl. 106—309)

This invention relates to slurries of siliceous pigments. More particularly, this invention relates to providing against excessive viscosity increase or gellation in aged slurries of siliceous pigments.

Siliceous pigment materials are employed in several chemical industries, notably the paper and rubber industries. These materials are often handled in bags. They are frequently added to the process in the form of finely divided dry powder. The cost of handling materials in this fashion is relatively high. Thus, it is frequently desirable to utilize slurries of pigments. In this fashion, the amount added can be determined more precisely and the addition can be facilitated with greater ease.

Handling pigments in the form of a slurry has several advantages. A major advantage is flexibility. When pigment is added to a process in 50-pound bags, for example, it is inconvenient to use increments of addition other than 50-pound units. The addition of pigment in slurry form makes it convenient to effect minor adjustments to a process. Further advantages of slurry systems are convenience of storage, reduction of manpower requirement and better adaptability to automatic control or automation. In addition, by mixing slurries of sufficiently high solids content, more pounds of pigment can be stored per unit volume in slurry form than in the dry or bagged form.

The pigments contemplated by this invention typically have average ultimate particle size below 0.1 micron. Suspensions or slurries of these materials often possess colloidal properties even though the ultimate particle size is somewhat larger than is typically considered to be in the colloidal range.

U.S. Patent 3,034,914, for example, the disclosure of which is hereby incorporated by reference, teaches the preparation of finely-divided siliceous pigments. The average ultimate particle size of these products, as measured by the electron microscope, is typically less than 1.0 micron, normally about 0.005 to 0.5 micron.

Chemically, these pigments are comprised primarily of silicon dioxide ($SiO_2$) and may be characterized by the formula $MO(SiO_2)_x$ wherein MO represents one or more metal oxides. The pigments contemplated by this invention are those wherein MO is an oxide of a multivalent metal, notably an alkaline earth metal oxide, e.g., calcium oxide. The $SiO_2$ content of the aforementioned pigment, on an anhydrous basis, is at least 50, usually above 75 percent by weight. As an example, the calcium oxide-silicon dioxide products can be represented on an anhydrous basis by the formula: $CaO(SiO_2)_x$, where $x$ preferably ranges from 5 to 11 including fractional values.

Slurries prepared from the hereinbefore described pigments commonly increase in viscosity upon aging. By "aging" is meant the passing of time after preparation of a slurry. According to this invention, it has been found that the viscosity of an aged slurry of these metal oxide-silicon dioxide pigment can be significantly decreased by providing to the liquid phase of the slurry ions capable of removing the metal ions of the metal oxide therefrom.

Although it is not intended to limit this invention to any particular theory, it is believed that the viscosity increase of a $CaO \cdot (SiO_2)_x$ pigment slurry, for example, is caused by calcium ions entering the aqueous phase of the slurry from the solid phase of the slurry after the slurry is prepared. It has been observed that as the concentration of calcium ions in the liquid phase of the slurry increases the viscosity of the slurry increases.

In any event, it has been found that by providing in an aged slurry containing this pigment compounds, in particular those which possess only monovalent cations, which provide to the aqueous phase of the slurry ions capable of removing calcium ions therefrom, the viscosity of the slurry is substantially reduced. Alternatively, the initial viscosity of a slurry of pigment containing calcium in ionizable form is maintained or reduced by including these compounds along with the pigment when the pigment is initially slurried.

The present invention will be more readily understood with reference to the following examples:

Example I

Slurries were prepared of a pigment, prepared in accordance with U.S. Patent 3,034,914, with the following approximate composition:

| | |
|---|---|
| $SiO_2$ | percent 80 |
| CaO | do 5 |
| Free water | do 7 |
| Sodium chloride | do 1 |
| $Al_2O_3$ | do 1 |
| $Fe_2O_3$ | do 0.2 |
| pH | 9.5 |
| Surface area | meters per gram 40 |
| Average particle size | microns 0.08 |

The slurries were prepared in 1, 2, and 3 pounds per gallon concentrations. As used throughout this specification, "pounds per gallon" of a pigment slurry is determined as follows:

(1) A 10–20 gram sample of slurry is dried in an oven at 110° C. for four hours. The percent solids is considered to equal:

$$\frac{107 \times \text{weight to nearest 0.01 gram of oven dry pigment}}{\text{weight to nearest 0.01 gram of slurry}}$$

The factor of 107 allows for 7 percent free moisture in the oven dry pigment. Free moisture typically ranges between about 5 and about 12 percent.

(2) The specific gravity of the slurry is determined by weighing equal volumes of slurry and water and dividing the weight of the slurry by the weight of the water.

(3) Pounds per gallon are considered equal to $$\frac{\text{percent solids} \times \text{specific gravity}}{12}$$

Two samples of each slurry were placed in one quart glass jars. To one such sample of each slurry was added one percent by weight, basis the oven dry weight of the

TABLE 1.—BROOKFIELD VISCOSITY IN CENTIPOISES

| Time | 3 lb./gal., control | 3 lb./gal., 1% $Na_2CO_3$ | 2 lb./gal., control | 2 lb./gal., 1% $Na_2CO_3$ | 1 lb./gal., control | 1 lb./gal., 1% $Na_2CO_3$ |
|---|---|---|---|---|---|---|
| 15 minutes | 190 | 200 | 13 | 17 | 7 | 7 |
| 1 hour | 1,075 | 155 | 19 | 24 | 7 | 7 |
| 2 hours | 3,335 | 150 | 47 | 39 | 7 | 7 |
| 4 hours | 4,866 | 85 | 128 | 21 | 7 | 7 |
| 1 day | 6,390 | 175 | 415 | 20 | 17 | 9 |
| 2 days | 7,320 | 265 | 481 | 22 | 28 | 9 |
| 7 days | 9,000 | 1,750 | 1,080 | 48 | 19 | 7 |
| 14 days | 64,000 | 5,000 | 2,625 | 90 | 23 | 8 | pigment in the slurry, $Na_2CO_3$. The electrolyte addition was made immediately after the slurries were prepared. At selected time intervals after preparation of the slurries each sample was vigorously shaken in its glass jar. Just prior to each shaking, the samples were checked to determine percent solids. Water was added if necessary to maintain the original percent solids of the samples. Viscosity was measured immediately after shaking with a Brookfield viscometer at 20 r.p.m. The results of the viscosity measurements are reported in Table 1.

Example II

The procedure of Example I is repeated substituting for $Na_2CO_3$: $H_2SO_4$, $NaHCO_3$, $Na_2SO_4$, $Na_2SO_3$, $K_2SO_3$, $LiCO_3$, $(NH_4)_2CO_3$, $K_2SO_3$, $H_2C_2O_4$, $Na_2C_2O_4$, $HCl$, $HNO_3$, and $K_2CO_3$. In each instance, it is observed that the viscosities of the treated samples upon aging are markedly lower than the viscosities of the corresponding controls.

Example III

A two pound per gallon slurry of the pigment of Example I was prepared. The slurry was allowed to age for several weeks. 800 ml. samples of the slurry were placed in quart glass jars. Various electrolytes were added to individual samples of slurry to test their effects on the viscosity of the slurry. The samples were shaken thoroughly to insure dissolution of solid additives. Viscosities were checked prior to electrolyte addition and following each incremental addition. Results are reported in Table 2.

TABLE 2

| Amount added [1] | Electrolyte molarity | Brookfield viscosity, centipoises | | | |
|---|---|---|---|---|---|
| | | 2 r.p.m. | 4 | 10 | 20 |
| Alum. ($Al_2(SO_4)_3 \cdot 18 H_2O$) | | | | | |
| 0 | 0.0 | 7,200 | 4,875 | 3,320 | 2,000 |
| 1 gram | 0.002 | 4,300 | 2,730 | 1,320 | 730 |
| 2 grams | 0.004 | 5,150 | 3,650 | 1,780 | 950 |
| 3 grams | 0.006 | 5,000 | 3,950 | 2,600 | 1,400 |
| 5 grams | 0.009 | 6,100 | 5,125 | 3,340 | 1,925 |
| 10 grams | 0.019 | 7,250 | 5,800 | 3,200 | 1,850 |
| 15 grams | 0.028 | 7,900 | 5,250 | 2,850 | 1,665 |
| 20 grams | 0.038 | 9,300 | 5,975 | 2,800 | 1,675 |
| $(NH_4)_2CO_3$ (30% $NH_3$) | | | | | |
| 0 | 0 | 7,500 | 6,150 | 4,620 | 2,725 |
| 1 gram | 0.008 | 5,000 | 3,050 | 1,520 | 895 |
| 2 grams | 0.017 | 1,300 | 850 | 470 | 330 |
| $NH_4OH$ (29% $NH_3$) | | | | | |
| 0 | 0 | 7,250 | 4,975 | 3,500 | 2,375 |
| 1 ml | 0.015 | 6,000 | 4,000 | 4,800 | 2,910 |
| 2 ml | 0.031 | 6,550 | 4,175 | 4,820 | 3,350 |
| $CaCl_2$ (Anhydrous) | | | | | |
| 0 | 0 | 7,500 | 5,200 | 3,500 | 2,165 |
| 1 gram | 0.011 | 8,000 | 5,550 | 4,180 | 2,470 |
| 2 grams | 0.023 | 6,000 | 5,325 | 4,700 | 2,795 |
| 3 grams | 0.034 | 8,000 | 5,850 | 4,350 | 2,950 |
| 4 grams | 0.045 | 7,250 | 6,000 | 4,800 | 2,875 |
| 4 grams [6] | 0.045 | 8,250 | 6,750 | 5,400 | 3,225 |
| $CO_2$ | | | | | |
| 0 [2] | | 8,000 | 6,000 | 4,250 | 2,525 |
| 15 min | | 600 | 500 | 310 | 240 |
| 30 min | | 100 | 150 | 100 | 75 |
| 45 min | | 50 | 125 | 80 | 55 |
| 60 min | | | 100 | 60 | 50 |
| 120 min | [3] 0.15 | | 50 | 40 | 25 |
| 120 min.[4] | [3] 0.15 | | 25 | 20 | 20 |
| 120 min.[5] | [3] 0.15 | | | 10 | 10 |
| 120 min.[7] | [3] 0.15 | 20 | 35 | 28 | 23 |
| HCl 1:1 | | | | | |
| 0 | 0 | 6,750 | 5,550 | 4,100 | 2,650 |
| 1 ml | 0.006 | 6,100 | 4,225 | 2,570 | 1,720 |
| 2 ml | 0.012 | 5,100 | 3,650 | 1,890 | 1,140 |
| 3 ml | 0.018 | 5,150 | 3,825 | 2,020 | 1,250 |
| 5 ml | 0.030 | 4,100 | 2,600 | 1,350 | 820 |
| 10 ml | 0.060 | 2,600 | 1,650 | 850 | 525 |
| $MgCl_2 \cdot 6H_2O$ | | | | | |
| 0 | 0 | 6,500 | 5,000 | 2,900 | 1,675 |
| 1 gram | 0.005 | 6,000 | 4,750 | 3,150 | 1,750 |
| 2 grams | 0.010 | 5,250 | 5,000 | 3,400 | 1,850 |
| 4 grams | 0.020 | 5,500 | 4,250 | 3,400 | 1,925 |
| 6 grams | 0.030 | 5,500 | 4,500 | 3,500 | 1,900 |
| 8 grams | 0.039 | 5,000 | 4,375 | 3,300 | 1,750 |
| 10 grams | 0.049 | 5,250 | 3,750 | 2,650 | 1,650 |

See footnotes at end of table.

| Amount added [1] | Electrolyte molarity | Brookfield viscosity, centipoises | | | |
|---|---|---|---|---|---|
| | | 2 r.p.m. | 4 | 10 | 20 |
| $MgSO_4 \cdot nH_2O$ (65.3%) | | | | | |
| 0 | 0 | 7,500 | 5,900 | 3,460 | >2,000 |
| 1 gram | 0.005 | 8,600 | 6,650 | 3,880 | >2,000 |
| 2 grams | 0.011 | 6,000 | 4,250 | 3,200 | 2,125 |
| 3 grams | 0.016 | 7,700 | 6,600 | 3,800 | >2,000 |
| $HNO_3$ (Concentrated) | | | | | |
| 0 | 0 | 6,100 | 5,000 | 3,500 | 2,100 |
| 1 ml | 0.016 | 5,800 | 3,750 | 1,940 | 1,100 |
| 2 ml | 0.031 | 4,350 | 2,550 | 1,250 | 745 |
| 3 ml | 0.047 | 3,300 | 2,025 | 1,050 | 625 |
| 5 ml | 0.078 | 2,000 | 1,300 | 740 | 470 |
| 10 ml | 0.155 | 1,300 | 980 | 508 | 328 |
| $H_3PO_4$ (86%) | | | | | |
| 0 | 0 | 7,600 | 4,450 | 3,500 | 2,180 |
| 1 gram | 0.015 | 8,300 | 5,975 | 3,500 | 1,980 |
| 2 grams | 0.030 | 7,600 | 5,875 | 4,200 | 2,250 |
| 3 grams | 0.044 | 11,000 | 7,125 | 2,900 | 1,700 |
| 5 grams | 0.074 | 10,750 | 7,075 | 3,900 | 2,165 |
| 7 grams | 0.104 | 11,000 | 6,875 | 3,510 | 1,975 |
| $KNO_3$ (Anhydrous) | | | | | |
| 0 | 0 | 6,200 | 4,950 | 3,400 | 2,010 |
| 1 gram | 0.008 | 6,450 | 4,750 | 3,130 | 1,855 |
| 2 grams | 0.016 | 5,600 | 3,675 | 2,650 | 1,625 |
| 3 grams | 0.024 | 5,700 | 4,500 | 3,050 | 1,825 |
| 5 grams | 0.040 | 5,800 | 4,525 | 2,800 | 1,660 |
| $H_2C_2O_4 \cdot 2H_2O$ | | | | | |
| 0 | 0 | 6,500 | 4,750 | 3,100 | 1,850 |
| 1 gram | 0.010 | 2,250 | 1,400 | 750 | 470 |
| 2 grams | 0.020 | 1,750 | 1,100 | 650 | 430 |
| 3 grams | 0.030 | 2,100 | 1,300 | 660 | 470 |
| 5 grams | 0.049 | 3,250 | 2,000 | 1,100 | 675 |
| $NaHCO_3$ (Anhydrous) | | | | | |
| 0 | 0 | 5,700 | 5,225 | 2,860 | 1,680 |
| 1 gram | 0.015 | 2,750 | 1,600 | 810 | 500 |
| 2 grams | 0.030 | 100 | 75 | 48 | 36 |
| 3 grams | 0.045 | 15 | 18 | 20 | 21 |
| 5 grams | 0.074 | | 12.5 | 16 | 17 |
| 7 grams | 0.104 | 5 | 15 | 18 | 19.5 |
| 10 grams | 0.149 | 15 | 22.5 | 21 | 20.5 |
| 15 grams | 0.223 | 40 | 37.5 | 31 | 26 |
| $Na_2CO_3$ (Anhydrous) | | | | | |
| 0 | 0 | 7,600 | 5,450 | 3,110 | 2,020 |
| 1 gram | 0.012 | 600 | 525 | 340 | 225 |
| 2 grams | 0.024 | 25 | 50 | 35 | 27.5 |
| 3 grams | 0.035 | 20 | 22.5 | 20 | 22.5 |
| 5 grams | 0.059 | 15 | 25 | 20 | 22 |
| 7 grams | 0.083 | 20 | 20 | 21 | 21 |
| 7 grams [6] | 0.083 | | | 8 | 16 |
| NaCl (Anhydrous) | | | | | |
| 0 | 0 | 7,600 | 6,650 | 3,320 | 1,940 |
| 1 gram | 0.021 | 6,800 | 5,250 | 2,520 | 1,430 |
| 2 grams | 0.042 | 6,700 | 5,200 | 2,580 | 1,450 |
| 3 grams | 0.064 | 6,500 | 4,450 | 2,360 | 1,310 |
| 4 grams | 0.085 | 5,900 | 4,600 | 2,130 | 1,210 |
| 5 grams | 0.106 | 6,000 | 4,500 | 2,520 | 1,070 |
| 5 grams [4] | 0.106 | 7,300 | 5,350 | 2,980 | 1,680 |
| 5 grams | 0.106 | 6,200 | 3,850 | 1,860 | 1,070 |
| 10 grams | 0.212 | 5,900 | 4,250 | 2,080 | 1,180 |
| 15 grams | 0.318 | 6,100 | 4,150 | 2,100 | 1,290 |
| 15 grams [7] | 0.318 | 7,600 | 5,750 | 3,440 | >2,000 |
| 5 grams [7] | 0.106 | 7,900 | 6,500 | 3,800 | >2,000 |
| $Na_3PO_4 \cdot 12H_2O$ | | | | | |
| 0 | 0 | 7,250 | 5,400 | 3,800 | 2,305 |
| 1 gram | 0.003 | 6,750 | 5,375 | 3,750 | 2,175 |
| 2 grams | 0.005 | 7,750 | 5,825 | 3,730 | 2,250 |
| 3 grams | 0.008 | 6,750 | 5,375 | 3,850 | 2,310 |
| 5 grams | 0.013 | 7,500 | 6,250 | 3,420 | 1,955 |
| 7 grams | 0.018 | 7,300 | 5,950 | 3,450 | 1,950 |
| 10 grams | 0.026 | 8,400 | 5,200 | 2,700 | 1,425 |
| 15 grams | 0.039 | 7,350 | 4,375 | 2,290 | 1,350 |
| $Na_2HPO_4$ (Anhydrous) | | | | | |
| 0 | 0 | 7,600 | 5,325 | 3,740 | 2,440 |
| 1 gram | 0.003 | 7,150 | 5,200 | 3,400 | 2,050 |
| 2 grams | 0.006 | 7,000 | 5,725 | 3,580 | 2,140 |
| 3 grams | 0.008 | 6,300 | 4,900 | 3,350 | 2,060 |
| $NaH_2PO_4$ (Anhydrous) | | | | | |
| 0 | 0 | 7,500 | 5,000 | 3,810 | 2,290 |
| 1 gram | 0.007 | 6,600 | 5,250 | 3,060 | 1,900 |
| 2 grams | 0.014 | 6,500 | 5,075 | 2,950 | 1,785 |
| 3 grams | 0.022 | 6,500 | 5,500 | 3,150 | 1,790 |

| Amount added [1] | Electrolyte molarity | Brookfield viscosity, centipoises | | | |
|---|---|---|---|---|---|
| | | 2 r.p.m. | 4 | 10 | 20 |
| Na₂SO₄ (Anhydrous) | | | | | |
| 0 | 0 | 7,600 | 6,000 | 3,440 | >2,000 |
| 1 gram | 0.009 | 6,000 | 4,500 | 2,360 | 1,360 |
| 2 grams | 0.018 | 5,800 | 3,700 | 1,680 | 960 |
| 3 grams | 0.028 | 5,500 | 3,100 | 1,400 | 810 |
| 4 grams | 0.037 | 5,600 | 3,250 | 1,460 | 810 |
| 5 grams | 0.046 | 4,100 | 4,350 | 1,140 | 640 |
| 7 grams | 0.064 | 3,600 | 2,050 | 960 | 560 |
| 9 grams | 0.083 | 2,800 | 1,600 | 780 | 460 |
| 11 grams | 0.101 | 2,700 | 1,500 | 720 | 430 |
| 15 grams | 0.148 | 2,100 | 1,300 | 640 | 390 |
| 15 grams [4] | 0.148 | 1,800 | 1,100 | 560 | 360 |
| 15 grams [5] | 0.148 | 3,100 | 1,880 | 980 | 630 |
| H₂SO₄ (Concentrated) | | | | | |
| 0 | 0 | 7,150 | 5,625 | 4,370 | 2,660 |
| 1 ml | 0.018 | 4,800 | 2,820 | 1,356 | 790 |
| 2 ml | 0.036 | 1,100 | 800 | 480 | 326 |
| 3 ml | 0.055 | 600 | 544 | 320 | 218 |
| 5 ml | 0.091 | 300 | 220 | 144 | 114 |
| Na₂SO₄ (Anhydrous) | | | | | |
| 0 | 0 | 8,000 | 5,100 | 3,400 | 2,250 |
| 1 gram | 0.010 | 4,000 | 2,550 | 1,000 | 600 |
| 2 grams | 0.020 | 250 | 200 | 140 | 90 |
| 3 grams | 0.030 | | 50 | 40 | 25 |
| 5 grams | 0.049 | | | | 10 |
| 5 grams [4] | 0.049 | 50 | 125 | 160 | 195 |

[1] Amount added to 800 ml. of slurry.
[2] Minutes of bubbling CO₂ through slurry.
[3] By analysis.
[4] One day after preparation.
[5] Three days after preparation.
[6] Seven days after preparation.
[7] Ten days after preparation.

Example IV 11.4 pounds of water was charged to an 8-inch diameter tank. The dry pigment of Example I was gradually added to the water in the tank. The pigment water mixture was agitated continuously with a mixer consisting of twin axial flow turbines. When about 33 to 34 percent by weight pigment, basis the slurry, had been added, the consistency of the slurry was dilatant and much too pasty to be agitated with the mixer. One percent, basis the dry pigment, $Na_2CO_3$ was then added to the slurry. Very shortly after this addition, the slurry became quite fluid. Pigment addition was continued until a 4-pound per gallon slurry was obtained (38 percent by weight pigment). The 4-pound per gallon slurry was sufficiently fluid to be easily agitated by the mixer.

The practice of this invention makes it possible to maintain the viscosity of slurries which normally decrease in fluidity upon aging at a low level. Thus, the pumping qualities of these slurries are more consistent than heretofore. In addition, an aged slurry of higher solids content can now be more conveniently pumped than was heretofore possible.

According to this invention, the viscosities of siliceous slurries containing as much as 4, typically about 2 to about 3½ pounds of pigment per gallon are conveniently established and maintained at sufficiently low levels to insure the fluidity and pumpability thereof. Slurries with viscosities below 2000 centipoises, as measured by the Brookfield viscometer at 20 r.p.m. and 25° C., are usually conveniently pumped by commonly available commercial equipment. Specialized equipment sometimes pumps fluids with viscosities as high as 10,000 centipoises. It is usually much more economical and convenient to handle slurries with viscosities substantially below 2000 centipoises, preferably below about 500 to about 1000 centipoises. These low viscosities are conveniently provided by the practice of this invention.

Hightly viscous slurries are usually difficult to filter. Thus, low fluidity often hampers the filtration step of a process. By practicing this invention, aged slurries are kept fluid thereby making them easier to filter. In this fashion, the solids content of a filter cake is increased.

In a preferred embodiment of this invention, siliceous pigment of the type described herein is mixed with water to make up a 2 to 4 pound per gallon slurry. The slurry is fed to a railroad tank car and is shipped to a consumer of the slurry, e.g., a paper manufacturer. A 2-pound per gallon slurry aged for about 2 days to about 2 weeks typically attains a viscosity of about 500 to about 3000 centipoises or more. A similarly aged 4-pound per gallon slurry often attains a viscosity in excess of about 50,000 to about 100,000 centipoises. The slurry is normally prepared sufficiently long before arrival of the tank car at its destination that it is moderately to extremely viscous, e.g., 2000 to 10,000 centipoises or more upon arrival. Thus, it is difficult, often impossible to pump or flow the slurry from the car. Carbon dioxide gas is bubbled through the slurry, typically from several points along the bottom of the interior of the tank car. It is usually unnecessary to agitate the slurry beyond the agitating action provided by the bubbling gas. The gas need typically be introduced for only a few minutes, usually 1 to 5, rarely more than about 10 minutes to reduce the viscosity of the slurry to an acceptable level, e.g., 200 to 500, rarely more than 1000 centipoises. The slurry is then easily removed from the car by pumps or by gravity flow into the plant. The slurry may be introduced directly from the car to the process stream of the plant or it may be directed to storage tanks.

Although this invention has been described with reference to certain specific embodiments, it is not intended thereby to limit its scope. Thus, although the examples recite electrolytes commonly available in the laboratory, it should be understood that this invention contemplates any electrolyte capable of removing from the aqueous phase of the slurry, the metal ions responsible for its viscosity increase. Thus, any electrolyte which replaces multivalent cations, from the aqueous phase of the siliceous slurries described herein with cations of lower charge, notably sodium, potassium, lithium, hydrogen, and ammonium ions, thereby reducing the average charge of the cations in the aqueous phase of the slurry is within the scope of this invention. In addition to carbon dioxide gas, the water soluble carbonates, sulfates, sulfites, hydrogen sulfates, hydrogen sulfites, and hydrogen carbonates of monovalent metals are particularly effective in the practice of this invention. Electrolytes which suppress the solubility of the metal oxide in the pigment as well as those which react with the metal oxide to form a substantially water insoluble compound containing the metal ion of the metal oxide are within contemplation.

Of course, this invention is applicable to slurries containing pigments in addition to the siliceous pigments described herein. It has been found that slurries of a mixture of pigments including a $CaO(SiO_2)_x$ type pigment often increase in viscosity on aging even though the other pigments in the mixture normally provide relatively constant viscosities on aging. The effect of electrolytes on the viscosities of these slurries of mixed pigments is similar to their effect on the viscosity of a slurry containing only $CaO(SiO_2)_x$ pigment. Aged slurries of mixed pigments, e.g., $TiO_2 = CaO(SiO_2)_x$, $Clay = CaO(SiO_2)_x$, or $TiO_2 = Clay = CaO(SiO_2)_x$ often exhibit increased viscosities even when the mixture contains less than about 5 percent by weight $CaO(SiO_2)_x$ pigment basis the solids on the slurry. Other pigments in admixture with $MO(SiO_2)_x$ pigments are naturally within contemplation, e.g., hydrated alumina, diatomaceous earth, and $CaCO_3$.

The two factors which most directly affect the viscosity of an aged slurry are the per cent by weight, basis the total pigment, of the metal oxide in the $MO(SiO_2)_x$ pigment and the total weight per gallon of pigment in the slurry. The quantity of electrolyte required to establish and/or maintain the viscosity of a slurry of a given solids content at a given level has been observed to be a function of the availability of the metal oxide cation, e.g., calcium ion, to the aqueous phase of the slurry. Of course, the physical properties of the other pigments in a mixture of pigments including the $MO(SiO_2)_x$ pigment contribute some effect on the viscosity of a slurry containing a given concentration of multivalent cations. In general, however, quantities of electrolyte, rarely in excess of an amount stoichiometric to the multivalent cation in ionizable form in the pigment, sufficient to establish and/or maintain acceptable viscosities in a slurry of $MO(SiO_2)_x$ pigment are approximately sufficient to achieve a similar viscosity in a slurry of mixed pigment containing about the same quantity of multivalent metal in ionizable form. Normally, additions of less than 10, usually less than 5, typically between about 1 to about 3 percent by weight, basis the oven dry $MO(SiO_2)_x$ pigment, of the electrolyte are sufficient.

What is claimed is:

1. A method of providing low viscosity for a slurry of pigment comprised primarily of silicon dioxide, containing at least 75 percent $SiO_2$ on an anhydrous basis and characterized by the formula $MO(SiO_2)_x$ wherein MO represents a metal oxide capable of providing multivalent cations to the aqueous phase of said slurry and $x$ is at least 5 which comprises providing to said slurry an effective amount up to 10 percent by weight, based on the oven dry $MO(SiO_2)_x$ pigment, of an electrolyte selected from the group consisting of the water-soluble nitrates, carbonates, sulfates, sulfites, hydrogen sulfates, hydrogen sulfites, and hydrogen carbonates of the constituents selected from the group consisting of hydrogen, ammonium, and the monovalent metals.

2. A method of providing low viscosity for a slurry of pigment comprised primarily of silicon dioxide, containing at least 75 percent $SiO_2$ on an anhydrous basis and characterized by the formula $MO(SiO_2)_x$ wherein MO represents a metal oxide capable of providing multivalent cations to the aqueous phase of said slurry and $x$ is at least 5 which comprises introducing to said slurry carbon dioxide gas in an amount equal to at least 1 percent by weight based on the weight of the oven dry pigment.

3. A method of providing low viscosity for a slurry of pigment comprised primarily of silicon dioxide and characterized by the formula $CaO(SiO_2)_x$ wherein $x$ is at least 5 which comprises introducing to said slurry carbon dioxide gas in an amount equal to at least 1 percent by weight based on the weight of the oven dry pigment.

4. A method of providing low viscosity for a slurry of pigment comprised primarily of silicon dioxide and characterized by the formula $CaO(SiO_2)_x$ wherein $x$ is at least 5 which comprises providing to said slurry an effective amount up to 10 percent by weight, based on the oven dry $CaO(SiO_2)_x$ pigment, of an electrolyte selected from the group consisting of the water-soluble nitrates, carbonates, sulfates, sulfites, hydrogen sulfates, hydrogen sulfites, and hydrogen carbonates of constituents selected from the group consisting of hydrogen, ammonium, and the monovalent metals.

5. The method of claim 4 wherein the electrolyte is selected from the group consisting of the carbonates, the hydrogen carbonates, the sulfates, the hydrogen sulfates, the sulfites and the hydrogen sulfites of hydrogen, ammonia, sodium, potassium and lithium.

6. The method of claim 4 wherein up to 5 percent by weight of the electrolyte is added to the slurry.

7. The method of claim 6 wherein between about 1 and about 3 percent by weight based on the oven dry weight of the pigment of the electrolyte is added to the slurry.

8. The method of claim 5 wherein between about 1 and about 3 percent by weight, based on the weight of the oven dry pigment, of the electrolyte is added to the slurry.

References Cited

UNITED STATES PATENTS

| | | | |
|---|---|---|---|
| 2,314,188 | 3/1943 | Allen | 106—306 |
| 2,259,481 | 10/1941 | Mowlds | 23—182 |

JAMES E. POER, *Primary Examiner.*